US012525882B2

(12) United States Patent
Wang

(10) Patent No.: US 12,525,882 B2
(45) Date of Patent: Jan. 13, 2026

(54) EXTERNAL LOOP COMPENSATION APPARATUS AND METHOD AND SYSTEM THEREOF, AND MEDIUM

(71) Applicant: SUZHOU METABRAIN INTELLIGENT TECHNOLOGY CO., LTD., Jiangsu (CN)

(72) Inventor: Lupan Wang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/873,687

(22) PCT Filed: Sep. 25, 2023

(86) PCT No.: PCT/CN2023/121187
§ 371 (c)(1),
(2) Date: Dec. 10, 2024

(87) PCT Pub. No.: WO2024/146181
PCT Pub. Date: Jul. 11, 2024

(65) Prior Publication Data
US 2025/0266766 A1    Aug. 21, 2025

(30) Foreign Application Priority Data
Jan. 4, 2023  (CN) .......................... 202310005673.5

(51) Int. Cl.
*H02M 3/158*  (2006.01)
*H02M 1/00*   (2007.01)
*H02M 1/14*   (2006.01)

(52) U.S. Cl.
CPC ....... *H02M 3/1582* (2013.01); *H02M 1/0016* (2021.05); *H02M 1/0025* (2021.05); *H02M 1/143* (2013.01)

(58) Field of Classification Search
CPC .......... H02M 1/14; H02M 1/15; H02M 1/143; H02M 1/0016; H02M 1/0019;
(Continued)

(56) References Cited

U.S. PATENT DOCUMENTS 7,034,612 B2    4/2006  Kim
11,444,540 B1*  9/2022  Langeslag ........... H02M 3/1586
(Continued)

FOREIGN PATENT DOCUMENTS

CN         1474516 A      2/2004
CN       101694962 A      4/2010
(Continued)

OTHER PUBLICATIONS

Chinese Search Report issued for CN Patent Application No. 202310005673.5.
(Continued)

*Primary Examiner* — Gustavo A Rosario-Benitez
(74) *Attorney, Agent, or Firm* — Merchant & Gould P.C.

(57)    ABSTRACT

The present disclosure discloses an external loop compensation apparatus and a method and system thereof, and a non-transitory readable storage medium. The loop compensation apparatus provided in the present disclosure includes a power detection unit, a compensation unit, and an MCU, wherein the power detection unit acquires a power supply parameter of a BUCK-BOOST power supply chip and then feeds back the power supply parameter to the MCU; according to the power supply parameter and a working state of the BUCK-BOOST power supply chip, the MCU determines that the working mode of the compensation unit is a phase compensation mode or a power compensation mode; and the compensation unit compensates for the BUCK-BOOST power supply chip according to a control signal of the MCU,
(Continued)

so as to achieve effective output compensation for each working state of the BUCK-BOOST power supply chip.

15 Claims, 5 Drawing Sheets

(58) Field of Classification Search
CPC .. H02M 1/0022; H02M 1/0025; H02M 3/158; H02M 3/1582; H02M 3/1566
See application file for complete search history.

(56) References Cited

U.S. PATENT DOCUMENTS

| | | | |
|---|---|---|---|
| 2009/0284235 A1 | 11/2009 | Weng et al. | |
| 2010/0231189 A1* | 9/2010 | Chen | H02M 3/1582 323/284 |
| 2011/0074373 A1* | 3/2011 | Lin | H02M 3/1582 323/282 |
| 2012/0146602 A1* | 6/2012 | Chen | H02M 3/1582 323/282 |
| 2017/0005577 A1* | 1/2017 | Chen | H02M 3/1582 |
| 2017/0077817 A1* | 3/2017 | Houston | H02M 3/1582 |
| 2018/0254704 A1* | 9/2018 | Unno | H02M 3/1582 |
| 2019/0181760 A1* | 6/2019 | Choi | H02M 3/1582 |
| 2022/0416657 A1* | 12/2022 | Floriani | H02M 1/0003 |
| 2023/0069460 A1* | 3/2023 | Langeslag | H02M 1/14 |
| 2023/0421039 A1* | 12/2023 | Castorina | H02M 1/0019 |

FOREIGN PATENT DOCUMENTS

| | | |
|---|---|---|
| CN | 105406483 A | 3/2016 |
| CN | 109327146 A | 2/2019 |
| CN | 115566714 A | 1/2023 |
| CN | 115694141 A | 2/2023 |
| WO | 2024146181 A1 | 7/2024 |

OTHER PUBLICATIONS

International Search Report and Written Opinion for International Patent Application No. PCT/CN2023/121187 mailed Dec. 6, 2023, with English translation of Search Report.
Chinese Decision to Grant issued for CN Patent Application No. 202310005673.5.
Chinese Office Action received for CN Application No. 202310005673.5 on Feb. 11, 2023, 13 pgs.

* cited by examiner

EXTERNAL LOOP COMPENSATION APPARATUS AND METHOD AND SYSTEM THEREOF, AND MEDIUM

CROSS-REFERENCE TO RELATED APPLICATIONS

The present application is a National Stage Application of PCT International Application No.: PCT/CN2023/121187 filed on Sep. 25, 2023, which claims priority to Chinese Patent Application 202310005673.5, filed in the China National Intellectual Property Administration on Jan. 4, 2023, the disclosure of which is incorporated herein by reference in its entirety.

TECHNICAL FIELD

The present disclosure relates to the field of power supply compensation, and in particular to an external loop compensation apparatus and a method and system thereof, and a non-transitory readable storage medium.

BACKGROUND

In the era of big data, higher requirements are proposed for the reliability and working efficiency of a storage system, and in order to meet the efficient and secure working requirements of the storage system, the power supply design of a storage mainboard is particularly important. In the current power supply design of the storage mainboard, a front end uses a buck circuit-boost circuit (BUCK-BOOST) power supply design to meet the output stability of a rear end of a battery when a power supply voltage is insufficient in the case of power standby of the battery, and similarly a BBU (Building Base band Unit) adapter board also uses the BUCK-BOOST design to implement efficient charging of a battery cell.

However, during a design process of applying a BUCK-BOOST power supply chip, different from the traditional loop compensation design of a single BUCK/single BOOST, it is very difficult for the single loop compensation of the chip to meet the stability requirement of a storage power supply during the application process of the BUCK-BOOST chip, and output ripples of the chip itself after compensation are still too large, resulting in unstable power supply of a load of the rear end, thereby restricting the high-reliability development of a storage device on a power supply end.

Therefore, it is a problem to be urgently solved by those skilled in the art that it is difficult for a loop compensation apparatus of a single BUCK/single BOOST to meet the power supply stability requirement, thus restricting the high-reliability development of a storage device on a power supply end.

SUMMARY

The objective of the present disclosure is to provide an external loop compensation apparatus and a method and system thereof, and a non-transitory readable storage medium, so as to solve the problem that it is difficult for a traditional loop compensation apparatus of a single BUCK/single BOOST to meet the power supply stability requirement, thus restricting the high-reliability development of a storage device on a power supply end.

In order to solve the above technical problem, the present disclosure provides an external loop compensation apparatus, including a power detection unit, a compensation unit, and an MCU (Micro controller Unit), wherein a first end of the power detection unit is connected with a first end of a BUCK-BOOST power supply chip, and is configured to acquire a power supply parameter of the BUCK-BOOST power supply chip; a second end of the power detection unit is connected with a first end of the MCU, and is configured to feed back the power supply parameter to the MCU; the first end of the MCU is connected with the second end of the power detection unit, and is configured to acquire a working state of the BUCK-BOOST power supply chip; a second end of the MCU is connected with a first end of the compensation unit, and is configured to determine a working mode of the compensation unit according to the power supply parameter and the working state of the BUCK-BOOST power supply chip; the working mode includes a phase compensation mode and a power compensation mode; and a second end of the compensation unit is connected with the BUCK-BOOST power supply chip, and is configured to provide a compensation for the BUCK-BOOST power supply chip according to a control signal of the MCU.

In an embodiment, the compensation unit includes a phase compensation unit and a power compensation unit; a first end of the phase compensation unit and a first end of the power compensation unit jointly serve as the first end of the compensation unit, and a second end of the phase compensation unit and a second end of the power compensation unit jointly serve as the second end of the compensation unit; the power compensation unit is configured to perform power supplementing and filtering on the BUCK-BOOST power supply chip when a difference value between a sampling voltage and a standard end voltage of the BUCK-BOOST power supply chip is less than a preset value, so as to implement the power compensation mode of the compensation unit; and the phase compensation unit is configured to perform current compensation when the BUCK-BOOST power supply chip works in a boost state, and perform voltage compensation when the BUCK-BOOST power supply chip works in a buck state, so as to implement the phase compensation mode of the compensation unit.

In an embodiment, the phase compensation unit includes a first power electronic switch, a second power electronic switch, a first-order voltage compensation module, a second-order voltage compensation module, and a current compensation module; a control end of the first power electronic switch and a control end of the second power electronic switch are respectively connected with an output end of the MCU, a first end of the first power electronic switch is connected with a first end of the first-order voltage compensation module, a second end of the first power electronic switch is connected with a first end of the current compensation module, a first end of the second power electronic switch is connected with a first end of the second-order voltage compensation module, a second end of the second power electronic switch is connected with the second end of the first power electronic switch, and the first power electronic switch and the second power electronic switch are respectively configured to control the startup and shutdown of the current compensation module and the second-order voltage compensation module according to a signal output by the MCU; a second end of the current compensation module is connected with the BUCK-BOOST power supply chip, and is configured to compensate for the current of the BUCK-BOOST power supply chip; a second end of the second-order voltage compensation module is connected with the BUCK-BOOST power supply chip, and is configured to compensate for the voltage of the BUCK-BOOST power supply chip; a second end of the first-order voltage compensation module is respectively connected with a third end of the current compensation module and a third end of the second-order voltage compensation module, and a third end of the first-order voltage compensation module, a fourth end of the second-order voltage compensation module and a fourth end of the current compensation module are grounded; a fourth end of the first-order voltage compensation module is connected with a fifth end of the second-order voltage compensation module, and is configured to amplify the difference value between the sampling voltage and the standard end voltage and input the amplified difference value to the current compensation module and the second-order voltage compensation module; the first end of the first power electronic switch, the second end of the second power electronic switch and the first end of the first-order voltage compensation module jointly serve as the first end of the phase compensation unit; the second end of the current compensation module and the second end of the second-order voltage compensation module jointly serve as the second end of the phase compensation unit; a first inductor is connected between the power supply chip and the phase compensation unit, and the first inductor is configured to store energy when the first power electronic switch and the second power electronic switch are turned on, and supply power when the first power electronic switch and the second power electronic switch are turned off; and a first end of the first inductor is connected with the first end of the BUCK-BOOST power supply chip and a fifth end of the current compensation module, and a second end of the first inductor is connected with the first end of the first power electronic switch, the second end of the second power electronic switch, and the first end of the first-order voltage compensation module.

In an embodiment, the current compensation module includes a first capacitor, a second capacitor, a first resistor, a second resistor, and a first operational amplifier; a positive power supply end of the first operational amplifier serves as the first end of the current compensation module; an output end of the first operational amplifier serves as the second end of the current compensation module; an in-phase input end of the first operational amplifier, a first end of the first capacitor and a first end of the second capacitor jointly serve as the third end of the current compensation module; a negative power supply end of the first operational amplifier serves as the fourth end of the current compensation module; a first end of the first resistor serves as the fifth end of the current compensation module, and is configured to perform sampling; a second end of the first resistor is connected with an inverted input end of the first operational amplifier; a second end of the first capacitor is connected with the output end of the first operational amplifier; a second end of the second capacitor is connected with the output end of the first operational amplifier via the second resistor; the first capacitor is configured to perform filtering; and the second capacitor and the second resistor form a TYPEII compensator, which is configured to perform current compensation.

In an embodiment, the first-order voltage compensation module includes a third capacitor, a third resistor, a fourth resistor, a fifth resistor, a reference power supply, and a common operational amplifier; a positive power supply end of the common operational amplifier and a first end of the third resistor jointly serve as the first end of the first-order voltage compensation module; an output end of the common operational amplifier and a first end of the fifth resistor jointly serve as the second end of the first-order voltage compensation module; an inverted input end of the common operational amplifier is connected with a first end of the reference power supply; a second end of the reference power supply and a first end of the fourth resistor jointly serve as the third end of the first-order voltage compensation module; an in-phase input end of the common operational amplifier, a first end of the third capacitor, a second end of the third resistor and a second end of the fourth resistor jointly serve as the fourth end of the first-order voltage compensation module; and a second end of the fifth resistor is connected with a second end of the third capacitor, and the third capacitor and the fifth resistor form an RC compensation circuit, which is configured to perform first-order voltage compensation.

In an embodiment, the second-order voltage compensation module includes a sixth resistor, a fourth capacitor, and a second operational amplifier; a positive power supply end of the second operational amplifier serves as the first end of the second-order voltage compensation module; an output end of the second operational amplifier and a first end of the sixth resistor jointly serve as the second end of the second-order voltage compensation module; an inverted input end of the second operational amplifier serves as the third end of the second-order voltage compensation module; a negative power supply end of the second operational amplifier serves as the fourth end of the second-order voltage compensation module; an in-phase input end of the second operational amplifier and a first end of the fourth capacitor jointly serve as the fifth end of the second-order voltage compensation module; and a second end of the sixth resistor is connected with a second end of the fourth capacitor, and the fourth capacitor and the sixth resistor form an RC compensation circuit, which is configured to perform second-order voltage compensation on the basis of the first-order voltage compensation of the first-order voltage compensation module.

In an embodiment, the power compensation unit includes a voltage stabilizing chip, a voltage with standing capacitor, and a filter capacitor; a common end of a first end of the voltage stabilizing chip, a second end of the voltage stabilizing chip, a first end of the voltage withstanding capacitor and a first end of the filter capacitor serves as the first end of the power compensation unit; a common end of a third end of the voltage stabilizing chip, a fourth end of the voltage stabilizing chip, a second end of the voltage withstanding capacitor and a second end of the filter capacitor serves as the second end of the power compensation unit; and the voltage with standing capacitor is configured to perform energy storage and low-frequency filtering on the output of a rear end, and the filter capacitor is configured to perform high-frequency filtering.

In an embodiment, there are a plurality of voltage with standing capacitors, and the plurality of voltage with standing capacitors are connected in parallel; and there are a plurality of filter capacitors, and the plurality of filter capacitors are connected in parallel.

In an embodiment, the loop compensation apparatus further includes a BMC, a third end of the MCU is connected with the BMC, and is configured to report abnormal information.

In order to solve the above technical problem, the present disclosure further provides a loop compensation method, which should be configured as a loop compensation apparatus including a power detection unit, a compensation unit and an MCU. The method includes: a power supply parameter of a BUCK-BOOST power supply chip is acquired via the power detection unit; a working state of the BUCK-BOOST power supply chip is acquired according to the power supply parameter; a compensation mode of the compensation unit is determined according to the power supply parameter and the working state, wherein the compensation mode includes a phase compensation mode and a power compensation mode; and the compensation unit is controlled to compensate for the BUCK-BOOST power supply chip in the compensation mode.

In an embodiment, the power supply parameter includes a sampling voltage, a sampling current, and a first voltage ripple signal.

In an embodiment, the working state of the BUCK-BOOST power supply chip includes a boost state and a buck state.

In an embodiment, acquiring the working state of the BUCK-BOOST power supply chip according to the power supply parameter includes: when the sampling voltage is higher than a standard end voltage of the BUCK-BOOST power supply chip, it is determined that the working state of the BUCK-BOOST power supply chip is the boost state; and when the sampling voltage is lower than the standard end voltage of the BUCK-BOOST power supply chip, it is determined that the working state of the BUCK-BOOST power supply chip is the buck state.

In an embodiment, determining the compensation mode of the compensation unit according to the power supply parameter and the working state includes: whether the sampling voltage meets a first preset condition is judged; when the sampling voltage meets the first preset condition, it is determined that the compensation mode of the compensation unit is the power compensation mode, and power compensation is performed on the BUCK-BOOST power supply chip; and when the sampling voltage does not meet the first preset condition, it is determined that the compensation mode of the compensation unit is the phase compensation mode, and phase compensation on the BUCK-BOOST power supply chip is performed according to the working state.

In an embodiment, judging whether the sampling voltage meets the first preset condition includes: a difference value between the sampling voltage and the standard end voltage is acquired; an absolute value of the difference value is acquired; whether the absolute value is less than a preset value is judged; when the absolute value is less than the preset value, it is determined that the sampling voltage meets the first preset condition; and when the absolute value is not less than the preset value, it is determined that the sampling voltage does not meet the first preset condition.

In an embodiment, when the compensation mode of the compensation unit is the phase compensation mode, performing phase compensation on the BUCK-BOOST power supply chip according to the working state includes: when the working state of the BUCK-BOOST power supply chip is the boost state, current compensation is performed on the BUCK-BOOST power supply chip; and when the working state of the BUCK-BOOST power supply chip is the buck state, voltage compensation is performed on the BUCK-BOOST power supply chip.

In an embodiment, after compensating for the BUCK-BOOST power supply chip in the compensation mode, the method further includes: a second voltage ripple signal of the BUCK-BOOST power supply chip is acquired; whether the second voltage ripple signal meets a second preset condition is judged; when the second voltage ripple signal meets the second preset condition, it is determined that power supply compensation is completed; and when the second voltage ripple signal does not meet the second preset condition, it is determined that the power supply compensation is not completed.

In an embodiment, when the second voltage ripple signal does not meet the second preset condition, after determining that the power supply compensation is not completed, the method further includes: abnormal information is reported.

In order to solve the above technical problem, the present disclosure further provides a loop compensation system, which should be configured as a loop compensation apparatus including a power detection unit, a compensation unit and an MCU, wherein the system includes: a first acquisition module, configured to acquire a power supply parameter of a BUCK-BOOST power supply chip via the power detection unit; a second acquisition module, configured to acquire a working state of the BUCK-BOOST power supply chip according to the power supply parameter; a determination module, configured to determine a compensation mode of the compensation unit according to the power supply parameter and the working state, wherein the compensation mode includes a phase compensation mode and a power compensation mode; and a control module, configured to control the compensation unit to compensate for the BUCK-BOOST power supply chip in the compensation mode.

In order to solve the above technical problem, the present disclosure further provides a computer non-transitory readable storage medium, wherein a computer program is stored on the computer non-transitory readable storage medium, and the computer program is configured to execute, when executed by a processor, the steps of the loop compensation method.

The loop compensation apparatus provided in the present disclosure includes the power detection unit, the compensation unit and the MCU, wherein the compensation unit includes the phase compensation mode and the power compensation mode, the power detection unit acquires the power supply parameter of the BUCK-BOOST power supply chip and then feeds back the power supply parameter to the MCU, and according to the power supply parameter and the working state of the BUCK-BOOST power supply chip, the MCU determines that the working mode of the compensation unit is the phase compensation mode or the power compensation mode. Compared with the situation in which single loop compensation cannot meet the stability requirement of a storage power supply, the compensation unit in the present disclosure uses corresponding working modes to compensate for different working states of the BUCK-BOOST power supply chip according to the control signal of the MCU, so as to achieve effective output compensation for each working state of the BUCK-BOOST power supply chip.

The loop compensation method and system, and the non-transitory readable storage medium provided in the present disclosure have the same beneficial effects as mentioned above.

BRIEF DESCRIPTION OF THE DRAWINGS

To illustrate embodiments of the present disclosure more clearly, a brief introduction on the drawings which are needed in the embodiments is given below. Apparently, the drawings in the description below are merely some of the embodiments of the present disclosure, based on which other drawings may be obtained by those ordinary skilled in the art without any creative effort.

DETAILED DESCRIPTION OF THE EMBODIMENTS

A clear and complete description of technical solutions in the embodiments of the present disclosure will be given below, in combination with the drawings in the embodiments of the present disclosure. Apparently, the embodiments described below are merely a part, but not all, of the embodiments of the present disclosure. All of other embodiments, obtained by those ordinary skilled in the art based on the embodiments in the present disclosure without any creative effort, fall into the protection scope of the present disclosure.

The core of the present disclosure is to provide an external loop compensation apparatus and a method and system thereof, and a non-transitory readable storage medium, which are applied to the field of power supply compensation, and are used for solving the problem that it is difficult for a traditional loop compensation apparatus of a single BUCK/ single BOOST to meet a power supply stability requirement, thus restricting the high reliability development of a storage device on a power supply end.

To enable those skilled in the art to better understand the solutions of the present disclosure, the present disclosure will be further described below in detail in combination with the drawings and specific implementations.

Figure 1:
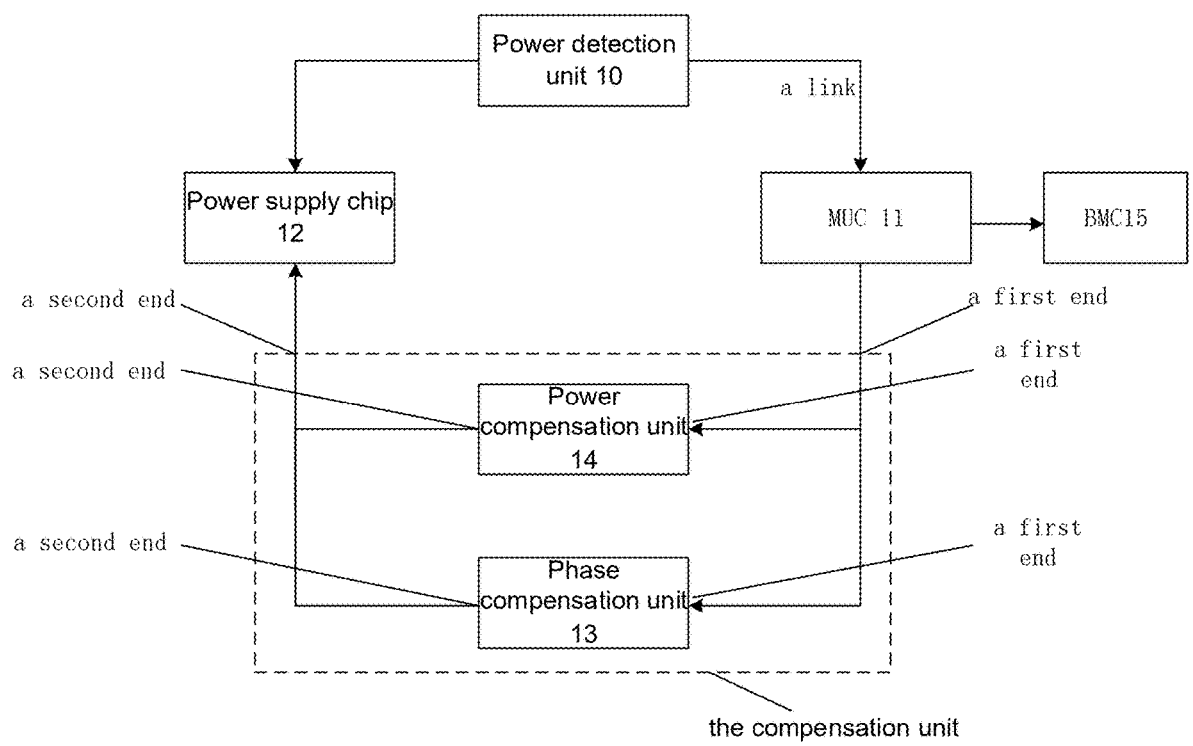
FIG. 1 is a topology diagram of an external loop compensation apparatus provided in an embodiment of the present disclosure.

An external loop compensation apparatus provided in an embodiment of the present disclosure is as shown in FIG. 1, FIG. 1 is a topology diagram of an external loop compensation apparatus provided in an embodiment of the present disclosure, wherein the external loop compensation apparatus includes a power detection unit 10, a compensation unit, and an MCU 11; and a first end of the power detection unit 10 is connected with a first end of a BUCK-BOOST power supply chip 12, and is configured to acquire a power supply parameter of the BUCK-BOOST power supply chip 12; and a second end of the power detection unit 10 is connected with a first end of the MCU 11, and is configured to feed back the power supply parameter to the MCU 11.

In an embodiment, in the embodiments of the present disclosure, the power detection unit 10 is provided on an output end of the BUCK-BOOST power supply chip 12, the power supply parameter of the BUCK-BOOST power supply chip 12 is acquired by connecting the first end of the BUCK-BOOST power supply chip 12 with the first end of the power detection unit 10, and the power supply parameter is fed back to the MCU 11.

The power supply parameter usually includes three types, that is, a voltage ripple, a voltage value and a current value, a sampled voltage signal is provided for the power detection unit 10 by a sampling resistor in the first end of the BUCK-BOOST power supply chip 12, the power detection unit 10 obtains the current value according to a sampled signal, and feeds back the sampled voltage value and current value to the MCU 11 via a link; and In an embodiment, the power detection unit 10 may use an SQ52201 sampling chip to perform voltage sampling and current sampling. Additionally, the power detection unit 10, in which a two-path differential proportional operational amplifier matches an operational amplifier subtraction circuit, is used to sample the voltage ripple, and the sampling idea is to amplify a sampled signal output from a rear end in two paths, provide a delay and make a difference between the two paths of amplified signals to obtain a final result. For example, the voltage signal obtained by the sampling resistor is sent to a two-path differential proportional amplification chip LM358DM2G, a path A and a path B respectively sample and amplify voltages at the same position, but due to the delay effect of an RC circuit on the path B, the path B has a certain delay compared with the path A during sampling, the sampled voltage signals of the two paths are output to a subtraction circuit after being amplified at the same amplification factor. Taking 100 folds as an example, the subtraction circuit makes a difference on the signals output by the two paths to obtain a voltage ripple signal that has been amplified by 100 folds, the amplified voltage ripple information is also fed back to the MCU 11 via an I2C link, and the MCU 11 autonomously reduces and corrects the voltage information, therefore the sampling link is completed.

It should be noted that, the sampling chip and the amplification chip are not limited in the embodiments of the present disclosure, and the sampling chip SQ52201 and the amplification chip LM358DM2G are merely optional.

A first end of the MCU 11 is connected with a second end of the power detection unit 10, and is configured to acquire a working state of the BUCK-BOOST power supply chip 12; a second end of the MCU 11 is connected with a first end of the compensation unit, and is configured to determine a working mode of the compensation unit according to the power supply parameter and the working state of the BUCK-BOOST power supply chip 12; and the working mode includes a phase compensation mode and a power compensation mode.

In an embodiment, after the MCU 11 acquires the power supply parameter via the power detection unit 10, the working state of the BUCK-BOOST power supply chip 12 may be determined by the power supply parameter, and the working mode of the compensation unit is determined to be the phase compensation mode or the power compensation mode according to the power supply parameter and the working state of the BUCK-BOOST power supply chip 12.

For example, when the difference between a voltage value received by the MCU 11 and a standard end voltage of the BUCK-BOOST power supply chip 12 is less than a preset value, it may be considered that the BUCK-BOOST power supply chip 12 is in a constant voltage state at this time, and it is determined that the working mode of the compensation unit is the power compensation mode; and when the difference between the voltage value received by the MCU 11 and the standard end voltage of the BUCK-BOOST power supply chip 12 is not less than the preset value, it may be considered that the BUCK-BOOST power supply chip 12 is in a non-constant voltage state at this time, and it is determined that the working mode of the compensation unit is the phase compensation mode. Further, the working state of the BUCK-BOOST power supply chip 12 is determined by the difference between the voltage value received by the MCU 11 and the standard end voltage of the BUCK-BOOST power supply chip 12, and when the difference between the voltage value received by the MCU 11 and the standard end voltage of the BUCK-BOOST power supply chip 12 is greater than zero, it is determined that the BUCK-BOOST power supply chip 12 is in a boost state; when the difference between the voltage value received by the MCU 11 and the standard end voltage of the BUCK-BOOST power supply chip 12 is less than zero, it is determined that the BUCK-BOOST power supply chip 12 is in a buck state; and the phase compensation mode is adjusted according to the boost state and the buck state of the BUCK-BOOST power supply chip 12.

A second end of the compensation unit is connected with the BUCK-BOOST power supply chip 12, and is configured to provide a compensation for the BUCK-BOOST power supply chip 12 according to a control signal of the MCU 11.

In an embodiment, the compensation unit determines the compensation mode according to the control signal of the MCU 11, and provides compensation of different modes for the BUCK-BOOST power supply chip 12 to meet different working states of the BUCK-BOOST power supply chip 12.

The loop compensation apparatus provided in the present disclosure includes the power detection unit 10, the compensation unit and the MCU 11, the power detection unit 10 acquires the power supply parameter of the BUCK-BOOST power supply chip 12 and then feeds back the power supply parameter to the MCU 11, according to the power supply parameter and the working state of the BUCK-BOOST power supply chip 12, the MCU 11 determines that the working mode of the compensation unit is the phase compensation mode or the power compensation mode, the compensation unit compensates for the BUCK-BOOST power supply chip 12 according to the control signal of the MCU 11, so as to achieve effective output compensation for each working state of the BUCK-BOOST power supply chip 12.

Based on the above embodiments, as an optional embodiment of the embodiments of the present disclosure, the compensation unit includes a phase compensation unit 13 and a power compensation unit 14; a first end of the phase compensation unit 13 and a first end of the power compensation unit 14 jointly serve as the first end of the compensation unit, and a second end of the phase compensation unit 13 and a second end of the power compensation unit 14 jointly serve as the second end of the compensation unit; the power compensation unit 14 is configured to perform power supplementing and filtering on the BUCK-BOOST power supply chip 12 when a difference value between a sampling voltage and the standard end voltage of the BUCK-BOOST power supply chip 12 is less than a preset value, so as to implement the power compensation mode of the compensation unit; and the phase compensation unit 13 is configured to perform current compensation when the BUCK-BOOST power supply chip 12 works in the boost state, and perform voltage compensation when the BUCK-BOOST power supply chip 12 works in the buck state, so as to implement the phase compensation mode of the compensation unit.

The compensation unit includes the phase compensation unit 13 and the power compensation unit 14, which respectively correspond to the phase compensation mode and the power compensation mode of the compensation unit. It should be noted that, the implementation methods of the power compensation unit 14 and the phase compensation unit 13 are not limited in the embodiments of the present disclosure, and as an optional solution, the power compensation unit 14 may be implemented by connecting a voltage with standing capacitor, a filter capacitor and a voltage stabilizing chip in parallel; and the phase compensation unit 13 may be implemented by using an operational amplifier to cooperate with a voltage and a resistor, an optional circuit will be described in the following embodiments in detail, and thus details are not repeated herein again.

In the loop compensation apparatus provided in the present disclosure, the compensation unit is defined to include the power compensation unit 14 and the phase compensation unit 13, which respectively correspond to the power compensation mode and the phase compensation mode of the compensation unit, the MCU 11 determines the working mode of the compensation unit as the phase compensation mode or the power compensation mode according to the power supply parameter and the working state of the BUCK-BOOST power supply chip 12, and the compensation unit compensates for the BUCK-BOOST power supply chip 12 according to the control signal of the MCU 11, so as to effective output compensation for each working state of the BUCK-BOOST power supply chip 12.

Figure 2:
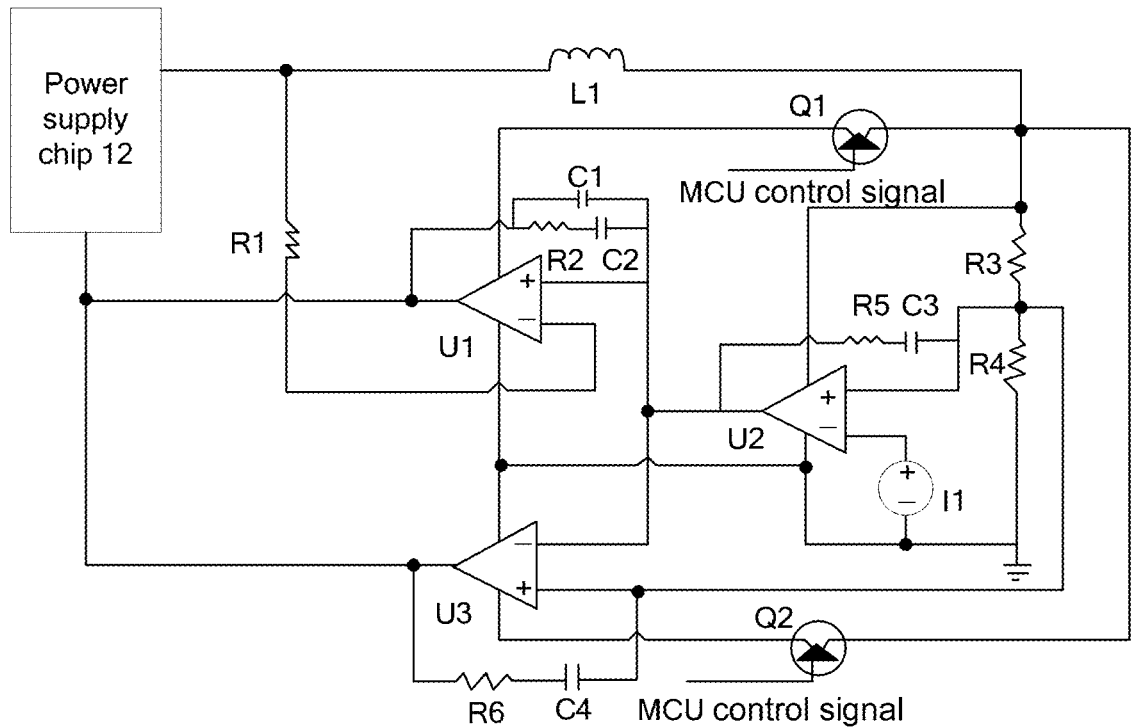
FIG. 2 is a circuit diagram of a phase compensation unit provided in an embodiment of the present disclosure.

Based on the above embodiments, as an optional embodiment of the embodiments of the present disclosure, as shown in FIG. 2, FIG. 2 is a circuit diagram of the phase compensation unit 13 provided in an embodiment of the present disclosure, wherein the phase compensation unit 13 includes a first power electronic switch Q1, a second power electronic switch Q2, a first-order voltage compensation module, a second-order voltage compensation module, and a current compensation module; a control end of the first power electronic switch Q1 and a control end of the second power electronic switch Q2 are respectively connected with an output end of the MCU 11, a first end of the first power electronic switch Q1 is connected with a first end of the first-order voltage compensation module, a second end of the first power electronic switch is connected with a first end of the current compensation module, a first end of the second power electronic switch Q2 is connected with a first end of the second-order voltage compensation module, a second end of the second power electronic switch Q2 is connected with the second end of the first power electronic switch Q1, and the first power electronic switch Q1 and the second power electronic switch Q2 are respectively configured to control the startup and shutdown of the current compensation module and the second-order voltage compensation module according to a signal output by the MCU 11; a second end of the current compensation module is connected with the BUCK-BOOST power supply chip 12, and is configured to compensate for the current of the BUCK-BOOST power supply chip 12; a second end of the second-order voltage compensation module is connected with the BUCK-BOOST power supply chip 12, and is configured to compensate for the voltage of the BUCK-BOOST power supply chip 12; a second end of the first-order voltage compensation module is respectively connected with a third end of the current compensation module and a third end of the second-order voltage compensation module, and a third end of the first-order voltage compensation module, a fourth end of the second-order voltage compensation module and a fourth end of the current compensation module are grounded; a fourth end of the first-order voltage compensation module is connected with a fifth end of the second-order voltage compensation module, and is configured to amplify the difference value between the sampling voltage and the standard end voltage and input the amplified difference value to the current compensation module and the second-order voltage compensation module; the first end of the first power electronic switch Q1, the second end of the second power electronic switch Q2 and the first end of the first-order voltage compensation module jointly serve as the first end of the phase compensation unit 13; the second end of the current compensation module and the second end of the second-order voltage compensation module jointly serve as the second end of the phase compensation unit 13; a first inductor is connected between the power supply chip 12 and the phase compensation unit 13, and the first inductor is configured to store energy when the first power electronic switch Q1 and the second power electronic switch Q2 are turned on, and supply power when the first power electronic switch and the second power electronic switch are turned off; and a first end of the first inductor is connected with the first end of the BUCK-BOOST power supply chip 12 and a fifth end of the current compensation module, and a second end of the first inductor is connected with the first end of the first power electronic switch Q1, the second end of the second power electronic switch Q2, and the first end of the first-order voltage compensation module.

In an embodiment, the phase compensation unit 13 includes two power electronic switches, the current compensation module, the first-order voltage compensation module, and the second-order voltage compensation module, and the working mode thereof includes two working modes, that is, a current compensation mode and a voltage compensation mode, which are respectively implemented by the current compensation module and the second-order voltage compensation module. The working voltages of the current compensation module and the second-order voltage compensation module are provided by the BUCK-BOOST power supply chip 12. The two power electronic switches control the startup and shutdown of the current compensation module and the second-order voltage compensation module according to the control signal of the MCU 11, when the current compensation module is started, current measurement and compensation are performed on the BUCK-BOOST power supply chip 12, and when the second-order voltage compensation module is started, voltage compensation is performed on the BUCK-BOOST power supply chip 12. Therefore, the phase compensation unit 13 is adjusted according to the working state of the BUCK-BOOST power supply chip 12, the phase compensation unit 13 ensures that voltage outputs in two power supply working states, that is, boost and buck, may be most suitably compensated by mode switching, and adaptive compensation adjustment may be performed according to output conditions in the compensation process.

It should be noted that, specific devices of the power electronic switch is not limited in the embodiments of the present disclosure, and may be a triode, a Schottky diode, etc.

In the loop compensation apparatus provided in the present disclosure, the phase compensation unit 13 is defined to include two power electronic switches, the current compensation module, the first-order voltage compensation module and the second-order voltage compensation module, the phase compensation unit 13 is adjusted according to the working state of the BUCK-BOOST power supply chip 12, and the phase compensation unit 13 ensures that voltage outputs in two power supply working states, that is, boost and buck, may be most suitably compensated by mode switching.

Based on the above embodiments, as an optional embodiment of the embodiments of the present disclosure, the current compensation module is further defined to include a first capacitor C1, a second capacitor C2, a first resistor R1, a second resistor R2, and a first operational amplifier U1; a positive power supply end of the first operational amplifier U1 serves as the first end of the current compensation module; an output end of the first operational amplifier U1 serves as the second end of the current compensation module;

an in-phase input end of the first operational amplifier U1, a first end of the first capacitor C1 and a first end of the second capacitor C2 jointly serve as the third end of the current compensation module; a negative power supply end of the first operational amplifier U1 serves as the fourth end of the current compensation module; a first end of the first resistor R1 serves as the fifth end of the current compensation module, and is configured to perform sampling; a second end of the first resistor R1 is connected with an inverted input end of the first operational amplifier U1; a second end of the first capacitor C1 is connected with the output end of the first operational amplifier U1; a second end of the second capacitor C2 is connected with the output end of the first operational amplifier U1 via the second resistor R2; the first capacitor C1 is configured to perform filtering; and the second capacitor C2 and the second resistor R2 form a TYPEII compensator, which is configured to perform current compensation.

In an embodiment, the current compensation module works in the boost state of the BUCK-BOOST power supply chip 12, and as the output voltage is gradually higher than the input voltage, a current ripple becomes greater in an output process, the current compensation module samples and compensates for the current to enable the output end of the BUCK-BOOST power supply chip 12 to receive change information more quickly, so that the robustness of the output of the BUCK-BOOST power supply chip 12 is stronger. The in-phase input end of the first operational amplifier U1 is connected with the second end of the first-order voltage compensation module to serve as a comparison reference voltage, a difference value between current information, which is obtained by connecting the inverted input end of the first operational amplifier U1 with an output inductor, that is, the first inductor L1, of the BUCK-BOOST power supply chip 12 via the first resistor R1 to perform current sampling, and the reference voltage is amplified in the first operational amplifier U1, and the amplified difference value is used as an adjusted feedback voltage of the BUCK-BOOST power supply chip 12 to control each MOS transistor of the BUCK-BOOST power supply chip 12, a TYPEII compensator is formed between the in-phase input end and the output end of the first operational amplifier U1 via the RC circuit composed of the second resistor R2 and the second capacitor C2, and is specially used for the current compensation herein, so that the sampling current changes along with inductive current.

In the loop compensation apparatus provided in the present disclosure, the current compensation module is defined to include the first capacitor C1, the second capacitor C2, the first resistor R1, the second resistor R2 and the first operational amplifier, the current compensation module works in the boost state of the BUCK-BOOST power supply chip 12, and the output end of the BUCK-BOOST power supply chip 12 may receive the change information more quickly by sampling and compensating for the current, so that the robustness of the output of the BUCK-BOOST power supply chip 12 is stronger.

Based on the above embodiments, as an optional embodiment of the embodiments of the present disclosure, the first-order voltage compensation module includes a third capacitor C3, a third resistor R3, a fourth resistor R4, a fifth resistor R5, a reference power supply I1, and a common operational amplifier U2; a positive power supply end of the common operational amplifier U2 and a first end of the third resistor R3 jointly serve as the first end of the first-order voltage compensation module; an output end of the common operational amplifier U2 and a first end of the fifth resistor R5 jointly serve as the second end of the first-order voltage compensation module; an inverted input end of the common operational amplifier U2 is connected with a first end of the reference power supply I1; a second end of the reference power supply I1 and a first end of the fourth resistor R4 jointly serve as the third end of the first-order voltage compensation module; an in-phase input end of the common operational amplifier U2, a first end of the third capacitor C3, a second end of the third resistor R3 and a second end of the fourth resistor R4 jointly serve as the fourth end of the first-order voltage compensation module; and a second end of the fifth resistor R5 is connected with a second end of the third capacitor C3, and the third capacitor C3 and the fifth resistor R5 form an RC compensation circuit, which is configured to perform first-order voltage compensation.

In an embodiment, after the voltage of the output end of the BUCK-BOOST power supply chip 12 is divided by a feedback resistor, that is, the third resistor R3, and a feedback resistor, that is, the fourth resistor R4, the voltage is preferentially input into the common operational amplifier U2, the in-phase input end of the common operational amplifier U2 outputs a voltage feedback value, the inserted input end of the common operational amplifier U2 is connected with the reference power supply I1 to obtain a reference voltage provided by a constant-voltage source, the RC compensation circuit composed of the fifth resistor R5 and the third capacitor C3 is connected between the in-phase input end and the output end of the common operational amplifier U2, so that the value of the feedback voltage can further change along with the power supply output on the input end, and after being amplified, a difference value between the feedback voltage and the reference voltage is used as the output of the common operational amplifier U2 to be connected to the current compensation module and the second-order voltage compensation module.

In the loop compensation apparatus provided in the present disclosure, the current compensation module is defined to include the third capacitor C3, the third resistor R3, the fourth resistor R4, the fifth resistor R5, the reference power supply I1 and the common operational amplifier, and the RC compensation circuit composed of the fifth resistor R5 and the third capacitor C3 is connected between the in-phase input end and the output end of the common operational amplifier, so that the value of the feedback voltage can further change along with the power supply output on the input end, so as to implement first-order voltage compensation.

Based on the above embodiments, as an optional embodiment of the embodiments of the present disclosure, the second-order voltage compensation module includes a sixth resistor R6, a fourth capacitor C4, and a second operational amplifier U3; a positive power supply end of the second operational amplifier U3 serves as the first end of the second-order voltage compensation module; an output end of the second operational amplifier U3 and a first end of the sixth resistor R6 jointly serve as the second end of the second-order voltage compensation module; an inverted input end of the second operational amplifier U3 serves as the third end of the second-order voltage compensation module; a negative power supply end of the second operational amplifier U3 serves as the fourth end of the second-order voltage compensation module; an in-phase input end of the second operational amplifier U3 and a first end of the fourth capacitor C4 jointly serve as the fifth end of the second-order voltage compensation module; and a second end of the sixth resistor R6 is connected with a second end of the fourth capacitor C4, and the fourth capacitor C4 and the sixth resistor R6 form an RC compensation circuit, which is configured to perform second-order voltage compensation on the basis of the first-order voltage compensation of the first-order voltage compensation module.

The RC compensation circuit composed of the sixth resistor R6 and the fourth capacitor C4 is connected between the in-phase input end of the second operational amplifier U3 and the output end of the second operational amplifier U3, and second-order voltage compensation is performed on the basis of the first-order voltage compensation. The second-order voltage compensation module works in the buck state of the BUCK-BOOST power supply chip 12, the current ripple in the buck state is more stable than the current ripple in the boost state, and current ripple is fed back by using an output voltage and is fed back to the end of the power supply chip 12 after being subjected to second-order compensation, thereby improving the stability of the output of the BUCK-BOOST power supply chip 12 in the buck state.

Based on the above embodiments, as an optional embodiment of the embodiments of the present disclosure, the power compensation unit 14 includes a voltage stabilizing chip, a voltage withstanding capacitor, and a filter capacitor; a common end of a first end of the voltage stabilizing chip, a second end of the voltage stabilizing chip, a first end of the voltage withstanding capacitor and a first end of the filter capacitor serves as the first end of the power compensation unit 14; a common end of a third end of the voltage stabilizing chip, a fourth end of the voltage stabilizing chip, a second end of the voltage withstanding capacitor and a second end of the filter capacitor serves as the second end of the power compensation unit 14; and the voltage withstanding capacitor is configured to perform energy storage and low-frequency filtering on the output of a rear end, and the filter capacitor is configured to perform high-frequency filtering.

It should be noted that, the number of voltage withstanding capacitors and the number of filter capacitors are not limited in the embodiments of the present disclosure, the greater the number is, the better the filtering and energy storage effects are, and meanwhile, the higher the cost is.

In the loop compensation apparatus provided in the present disclosure, the power compensation unit 14 is defined, when the difference between the voltage value received by the MCU 11 and the standard end voltage of the BUCK-BOOST power supply chip 12 is less than the preset value, at this time, since the mode switching of the BUCK-BOOST power supply chip 12 is in a frequent state, the voltage output is unstable, the instability caused by the frequent mode switching cannot be compensated by phase, therefore the power compensation unit 14 helps the BUCK-BOOST power supply chip 12 to perform voltage stabilization on the voltage output.

Based on the above embodiments, as an optional embodiment of the embodiments of the present disclosure, there are a plurality of voltage with standing capacitors, and the plurality of voltage with standing capacitors are connected in parallel; and there are a plurality of filter capacitors, and the plurality of filter capacitors are connected in parallel.

Figure 3:
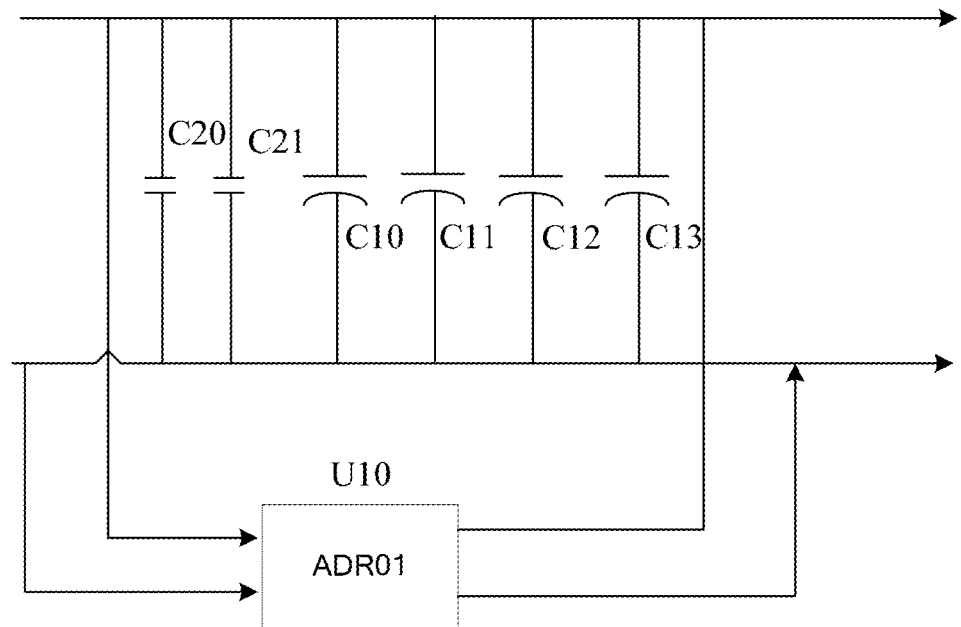
FIG. 3 is a circuit diagram of a power compensation unit provided in an embodiment of the present disclosure.

In the embodiments of the present disclosure, it is defined that there are the plurality of voltage with standing capacitors and the plurality of filter capacitors, the greater the number is, the better the filtering and energy storage effects are, and meanwhile, the higher the cost of the power compensation unit 14 is. As an optional embodiment, as shown in FIG. 3, FIG. 3 is a circuit diagram of the power compensation unit 14 provided in an embodiment of the present disclosure, wherein the power compensation unit 14 includes: four 470UF aluminum electrolytic capacitors C10, C11, C12 and C13 with withstand voltages of 25V, which are configured to perform energy storage and low-frequency filtering on the output of the rear end; two 25V 0.1UF capacitors C20 and C21, which are configured to filter out high-frequency harmonics; and a voltage stabilizing chip U10. In an embodiment, ADR01 may be selected as the voltage stabilizing chip U10, the enabling of the chip is provided by the MCU 11, when the power supply output ripple is greater than 5%, the MCU 11 provides an enabling signal for the voltage stabilizing chip, and at this time, the voltage stabilizing chip starts to work and provides a stable voltage output to for the output end.

In the loop compensation apparatus provided in the present embodiment, the power compensation unit 14 is defined, and it is defined that there are the plurality of voltage with standing capacitors, and the plurality of voltage with standing capacitors are connected in parallel; and there are the plurality of filter capacitors, and the plurality of filter capacitors are connected in parallel, so that the filtering and energy storage effects of the power compensation unit 14 are better.

Based on the above embodiments, as an optional embodiment of the embodiments of the present disclosure, the loop compensation apparatus further includes a BMC 15, a third end of the MCU 11 is connected with the BMC 15, and is configured to report abnormal information.

The loop compensation apparatus provided in the embodiments of the present disclosure further includes the BMC 15, when it is detected that the BUCK-BOOST power supply chip 12 still does not meet a ripple requirement after being compensated for, the MCU 11 reports abnormal information to the BMC 15 unit of the storage system, so as to facilitate the parameter configuration of the BUCK-BOOST power supply chip 12 in subsequent test processes.

Figure 4:
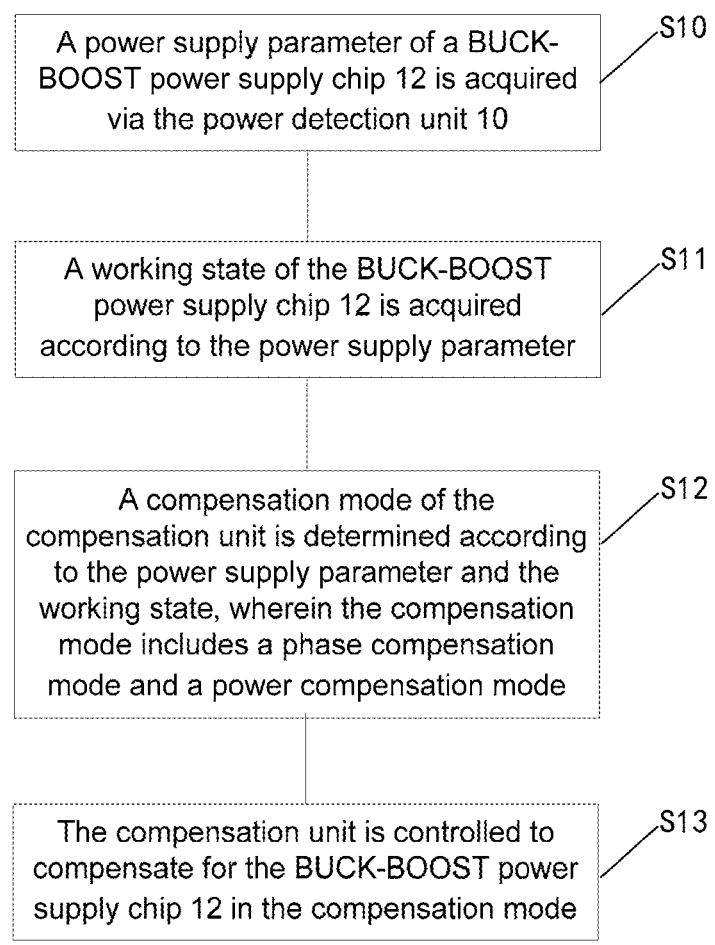
FIG. 4 is a flowchart of a loop compensation method provided in an embodiment of the present disclosure.

In order to solve the above technical problem, the present disclosure further provides a loop compensation method, applied to a loop compensation apparatus including a power detection unit 10, a compensation unit and an MCU 11. As shown in FIG. 4, FIG. 4 is a flowchart of a loop compensation method provided in an embodiment of the present disclosure. The method includes: S10: a power supply parameter of a BUCK-BOOST power supply chip 12 is acquired via the power detection unit 10; S11: a working state of the BUCK-BOOST power supply chip 12 is acquired according to the power supply parameter; S12: a compensation mode of the compensation unit is determined according to the power supply parameter and the working state, wherein the compensation mode includes a phase compensation mode and a power compensation mode; and S13: the compensation unit is controlled to compensate for the BUCK-BOOST power supply chip 12 in the compensation mode.

Since the embodiments of the method correspond to the embodiments of the apparatus, with regard to the embodiments of the apparatus, reference may be made to the description of the embodiments of the method, and thus details are not repeated herein.

As an optional embodiment of the embodiments of the present disclosure, the power supply parameter is defined to include a sampling voltage, a sampling current, and a first voltage ripple signal.

In the embodiments of the present disclosure, the power supply parameter is defined to include the sampling voltage, the sampling current and the first voltage ripple signal, the working state of the BUCK-BOOST power supply chip 12 is determined by the three types of parameters, and the BUCK-BOOST power supply chip 12 is compensated according to the three types of parameters, so as to meet the requirements for stability in different modes of the BUCK-BOOST power supply chip 12.

Based on the above loop compensation method, as an optional embodiment of the embodiments of the present disclosure, the working state of the BUCK-BOOST power supply chip 12 includes a boost state and a buck state.

In the embodiments of the present disclosure, it is defined that the working state of the BUCK-BOOST power supply chip 12 includes the boost state and the buck state, and different compensation methods are used for the boost state and the buck state to meet the requirements for stability in different modes of the BUCK-BOOST power supply chip 12.

As an optional embodiment of the embodiments of the present disclosure, acquiring the working state of the BUCK-BOOST power supply chip 12 according to the power supply parameter includes: when the sampling voltage is higher than a standard end voltage of the BUCK-BOOST power supply chip 12, it is determined that the working state of the BUCK-BOOST power supply chip 12 is the boost state; and when the sampling voltage is lower than the standard end voltage of the BUCK-BOOST power supply chip 12, it is determined that the working state of the BUCK-BOOST power supply chip 12 is the buck state.

After acquiring the power supply parameter, the MCU 11 acquires the working state of the BUCK-BOOST power supply chip 12 according to the power supply parameter, and In an embodiment, the working state of the BUCK-BOOST power supply chip 12 is determined by a magnitude relationship between the sampling voltage and the standard end voltage of the BUCK-BOOST power supply chip 12. When the sampling voltage is higher than the standard end voltage of the BUCK-BOOST power supply chip 12, it is determined that the working state of the BUCK-BOOST power supply chip 12 is the boost state; and when the sampling voltage is lower than the standard end voltage of the BUCK-BOOST power supply chip 12, it is determined that the working state of the BUCK-BOOST power supply chip 12 is the buck state, and different compensation methods are used for the boost state and the buck state to meet the requirements for stability in different modes of the BUCK-BOOST power supply chip 12.

According to the loop compensation method provided in the embodiments of the present disclosure, a specific definition is provided for the process of acquiring the working state of the BUCK-BOOST power supply chip 12, the acquisition method is simple, and the reliability is high.

Based on the above embodiments, as an optional embodiment of the embodiments of the present disclosure, determining the compensation mode of the compensation unit according to the power supply parameter and the working state includes: it is judged whether the sampling voltage meets a first preset condition; if the sampling voltage meets the first preset condition, it is determined that the compensation mode of the compensation unit is the power compensation mode, and power compensation is performed on the BUCK-BOOST power supply chip 12; and if the sampling voltage does not meet the first preset condition, it is determined that the compensation mode of the compensation unit is the phase compensation mode, and phase compensation is performed on the BUCK-BOOST power supply chip 12 according to the working state.

In an embodiment, the compensation mode of the compensation unit includes power compensation and phase compensation, firstly, the compensation mode is determined according to whether the sampling voltage in the power supply parameter meets the first preset condition, if so, power compensation is performed, and if not, phase compensation is performed. Moreover, when the sampling voltage does not meet the first preset condition, it is still necessary to perform appropriate phase compensation on the BUCK-BOOST power supply chip 12 according to the working state of the BUCK-BOOST power supply chip 12.

In the embodiments of the present disclosure, the first preset condition is not defined, and may be whether the difference value between the sampling voltage and the standard end voltage is less than the preset value, or may be a proportional relationship between the sampling voltage and the standard end voltage, etc.

According to the loop compensation method provided in the embodiments of the present disclosure, after the power supply parameter and the working state of the BUCK-BOOST power supply chip 12 are acquired, when the sampling voltage meets the first preset condition, power compensation is performed on the BUCK-BOOST power supply chip 12, and when the BUCK-BOOST power supply chip 12 does not meet the first preset condition, phase compensation is further performed on the BUCK-BOOST power supply chip 12 according to the working state of the BUCK-BOOST power supply chip 12, so as to meet the requirements for stability in different modes of the BUCK-BOOST power supply chip 12.

As an optional embodiment of the embodiments of the present disclosure, judging whether the sampling voltage meets the first preset condition includes: a difference value between the sampling voltage and the standard end voltage is acquired; an absolute value of the difference value is acquired; it is judged whether the absolute value is less than a preset value; and
- if the absolute value is less than the preset value, it is determined that the sampling voltage meets the first preset condition; and if the absolute value is not less than the preset value, it is determined that the sampling voltage does not meet the first preset condition.

In the embodiments of the present disclosure, judging whether the sampling voltage meets the first preset condition is further defined, the difference value between the sampling voltage and the standard end voltage of the BUCK-BOOST power supply chip 12 is acquired at first, then the absolute value of the difference value is acquired, when the absolute value is less than the preset value, it indicates that an input voltage of the BUCK-BOOST power supply chip 12 is close to an output voltage thereof, at this time, the mode switching of the BUCK-BOOST power supply chip 12 is in a frequent state, resulting in an unstable voltage output, and the instability caused by the frequent mode switching cannot be compensated by phase, so that it is determined that the sampling voltage meets the first preset condition, and power compensation is performed on the BUCK-BOOST power supply chip 12. When the absolute value of the difference value is greater than the preset value, it is determined that the sampling voltage does not meet the first preset condition, and phase compensation is performed on the BUCK-BOOST power supply chip 12.

According to the loop compensation method provided in the embodiments of the present disclosure, it is defined that whether the sampling voltage meets the first preset condition is determined according to a magnitude relationship of the absolute value of the difference value between the sampling voltage and the standard end voltage of the BUCK-BOOST power supply chip 12 with the preset value, so as to determine a suitable compensation mode to compensate for the BUCK-BOOST power supply chip 12, thereby meeting the compensation required for different states of the BUCK-BOOST power supply chip 12.

As an optional embodiment of the embodiments of the present disclosure, when the compensation mode of the compensation unit is the phase compensation mode, phase compensation is performed on the BUCK-BOOST power supply chip 12 according to the working state includes: when the working state of the BUCK-BOOST power supply chip 12 is the boost state, current compensation is performed on the BUCK-BOOST power supply chip 12; and when the working state of the BUCK-BOOST power supply chip 12 is the buck state, voltage compensation is performed on the BUCK-BOOST power supply chip 12.

According to the loop compensation method provided in the embodiments of the present disclosure, phase compensation is further divided into two types, that is, current compensation and voltage compensation, when the working state of the BUCK-BOOST power supply chip 12 is the boost state, current compensation is performed, and when the working state of the BUCK-BOOST power supply chip 12 is the buck state, voltage compensation is performed, so that the chip can more accurately and quickly cope with output compensation during the switching of the boost state and the buck state of the BUCK-BOOST power supply chip 12.

As an optional embodiment of the embodiments of the present disclosure, after compensating for the BUCK-BOOST power supply chip 12 in the compensation mode, the method further includes: a second voltage ripple signal of the BUCK-BOOST power supply chip 12 is acquired; it is judged whether the second voltage ripple signal meets a second preset condition; if the second voltage ripple signal meets the second preset condition, it is determined that power supply compensation is completed; and if the second voltage ripple signal does not meet the second preset condition, it is determined that the power supply compensation is not completed.

After the BUCK-BOOST power supply chip 12 is compensated, the current second voltage ripple signal of the BUCK-BOOST power supply chip 12 is acquired via the power detection unit 10, and when the second voltage ripple signal meets the second preset condition, it indicates that the power supply compensation is completed; and when the second voltage ripple signal does not meet the second preset condition, it indicates that the compensation does not meet the requirement of the BUCK-BOOST power supply chip 12, and the power supply compensation is not completed.

According to the loop compensation method provided in the embodiments of the present disclosure, after the BUCK-BOOST power supply chip 12 is compensated, the voltage ripple signal is detected again to judge whether the compensation for the BUCK-BOOST power supply chip 12 is competed.

As an optional embodiment of the embodiments of the present disclosure, when the second voltage ripple signal does not meet the second preset condition, after determining that the power supply compensation is not completed, the method further includes: abnormal information is reported.

According to the loop compensation method provided in the embodiments of the present disclosure, when the second voltage ripple signal does not meet the second preset condition, the abnormal information is reported to facilitate parameter configuration of the BUCK-BOOST power supply chip 12 in subsequent test processes.

Figure 5:
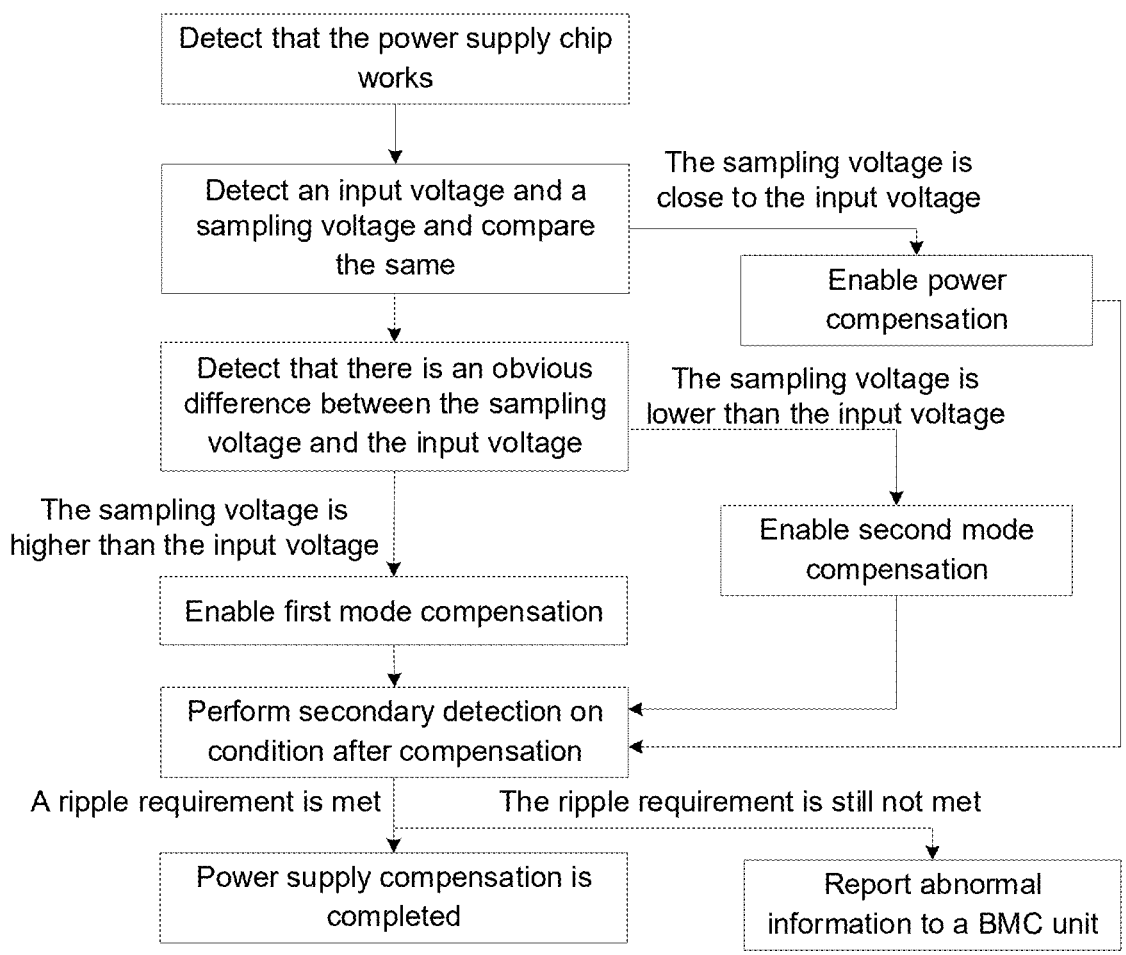
FIG. 5 is a flowchart of a loop compensation disclosure.

An embodiment of the present disclosure provides an disclosure embodiment of the loop compensation method, as shown in FIG. 5, and FIG. 5 is a flowchart of a loop compensation disclosure. After it is detected that the BUCK-BOOST power supply chip 12 is in a working state, an input voltage and a sampling voltage are detected and compared, wherein the input voltage is the standard end voltage of the BUCK-BOOST power supply chip 12. When a difference value between the sampling voltage and the input voltage is less than a preset value, it is considered that the sampling voltage is close to the input voltage, and at this time, power compensation is enabled; and when the difference value between the sampling voltage and the input voltage is not less than the preset value, it is detected that there is an obvious difference between the sampling voltage and the input voltage, and the sampling voltage and the input voltage are further compared. When the sampling voltage is higher than the input voltage, first mode compensation is enabled, and the first mode compensation is current compensation; and when the sampling voltage is lower than the input voltage, second mode compensation is enabled, and the second mode compensation is second-order voltage compensation. After the first mode compensation or the second mode compensation is performed on the BUCK-BOOST power supply chip 12, secondary detection is performed on the condition after compensation, if the secondary detection condition meets a requirement, it is determined that power supply compensation is completed, and when the secondary detection condition does not meet the requirement, abnormal information is reported to the BMC 15 unit. For example, after it is monitored that the output voltage ripple of the BUCK-BOOST power supply chip 12 meets the requirement of 3%, the compensation of the power supply output is completed, and on the contrary, when it is detected that the power supply output still cannot meet the ripple requirement after being compensated, the MCU 11 reports abnormal information to the BMC 15 unit of the storage system to facilitate the parameter configuration of the BUCK-BOOST power supply chip 12 in subsequent test processes.

In the embodiments of the present disclosure, the BUCK-BOOST power supply chip 12 is compensated to meet the requirements for stability in different modes of the BUCK-BOOST power supply chip 12, and secondary detection is performed after compensation to determine whether the power supply compensation is completed. When the power supply compensation is not completed, the abnormal information is reported to facilitate the parameter configuration of the BUCK-BOOST power supply chip 12 in subsequent test processes.

Figure 6:
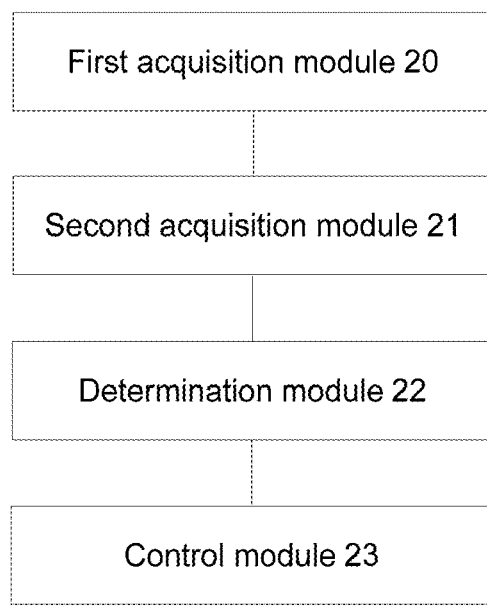
FIG. 6 is a schematic diagram of a loop compensation system provided in an embodiment of the present disclosure.

Based on the angle of functional modules, an embodiment of the present disclosure provides a loop compensation system, applied to a loop compensation apparatus including a power detection unit 10, a compensation unit and an MCU 11, as shown in FIG. 6, and FIG. 6 is a schematic diagram of a loop compensation system provided in an embodiment of the present disclosure. The system includes: a first acquisition module 20, configured to acquire a power supply parameter of a BUCK-BOOST power supply chip 12 via the power detection unit 10; a second acquisition module 21, configured to acquire a working state of the BUCK-BOOST power supply chip 12 according to the power supply parameter; a determination module 22, configured to determine a compensation mode of the compensation unit according to the power supply parameter and the working state, wherein the compensation mode includes a phase compensation mode and a power compensation mode; and a control module 23, configured to control the compensation unit to compensate for the BUCK-BOOST power supply chip 12 in the compensation mode.

Since the embodiments of the system correspond to the embodiments of the apparatus, with regard to the embodiments of the system, reference may be made to the description of the embodiments of the apparatus, and thus details are not repeated herein.

Finally, the present disclosure further provides an embodiment corresponding to a computer non-transitory readable storage medium, wherein a computer program is stored on the computer non-transitory readable storage medium, and the computer program is configured to execute, when executed by a processor, the steps recorded in the above method embodiments.

It can be understood that, if the method in the above embodiments is implemented in the form of a software functional unit and is sold or used as an independent product, it may be stored in a non-transitory computer-readable storage medium. Based on this understanding, the technical solutions of the present disclosure substantially, or the part contributing to the prior art, or a part or all of the technical solutions may be implemented in the form of a software product, the computer software product is stored in a non-transitory readable storage medium, and executes all or part of the steps of the method in various embodiments of the present disclosure. The foregoing non-transitory readable storage medium includes a variety of non-transitory readable storage media capable of storing program codes, such as a USB disk, a mobile hard disk, a read-only memory (ROM), a random access memory (RAM), a magnetic disk, or an optical disk.

The external loop compensation apparatus and the method and system thereof, and the non-transitory readable storage medium provided in the present disclosure have been described above in detail. The embodiments in the specification are described in a progressive manner, each embodiment focuses on differences from other embodiments, and the same or similar parts between the embodiments refer to each other. For the apparatus disclosed in the embodiments, the apparatus corresponds to the method disclosed in the embodiments, and thus is described relatively simple, and for related parts, reference may be made to the description of the method. It should be noted that, for those ordinary skilled in the art, several improvements and modifications may also be made to the present disclosure without departing from the principles of the present disclosure, and these improvements and modifications also fall within the protection scope of the claims of the present disclosure.

It should also be noted that in the present specification, relational terms, such as first and second, are merely used for distinguishing one entity or operation from another entity or operation, and do not necessarily require or imply that any such actual relationship or order exists between these entities or operations. Moreover, the terms "include", "contain" or any other variants thereof are intended to cover non-exclusive inclusions, such that a process, a method, an article or a device including a series of elements not only includes those elements, but also includes other elements that are not explicitly listed, or also includes elements inherent to such a process, method, article or device. If there are no more restrictions, the element defined by the sentence "including a . . . " does not exclude the existence of other identical elements in the process, the method, the article or the device that includes the element.

What is claimed is:

1. An external loop compensation apparatus, comprising a power detection unit, a compensation unit, and a microcontroller unit (MCU), wherein the compensation unit comprises a phase compensation unit and a power compensation unit, wherein a first end of the power detection unit is connected with a first end of a buck circuit-boost circuit (BUCK-BOOST) power supply chip, and is configured to acquire a power supply parameter of the BUCK-BOOST power supply chip; a second end of the power detection unit is connected with a first end of the MCU, and is configured to feed back the power supply parameter to the MCU;

the first end of the MCU is connected with the second end of the power detection unit, and is configured to acquire a working state of the BUCK-BOOST power supply chip; a second end of the MCU is connected with a first end of the compensation unit, and is configured to determine a working mode of the compensation unit according to the power supply parameter and the working state of the BUCK-BOOST power supply chip; the working mode comprises a phase compensation mode and a power compensation mode; and a second end of the compensation unit is connected with the BUCK-BOOST power supply chip, and is configured to provide a compensation for the BUCK-BOOST power supply chip according to a control signal of the MCU;

a first end of the phase compensation unit and a first end of the power compensation unit jointly serve as the first end of the compensation unit, and a second end of the phase compensation unit and a second end of the power compensation unit jointly serve as the second end of the compensation unit;

the power compensation unit is configured to perform power supplementing and filtering on the BUCK-BOOST power supply chip when a difference value between a sampling voltage and a standard end voltage of the BUCK-BOOST power supply chip is less than a preset value, so as to implement the power compensation mode of the compensation unit; and the phase compensation unit is configured to perform current compensation when the BUCK-BOOST power supply chip works in a boost state, and perform voltage compensation when the BUCK-BOOST power supply chip works in a buck state, so as to implement the phase compensation mode of the compensation unit.

2. The external loop compensation apparatus according to claim 1, wherein the phase compensation unit comprises a first power electronic switch, a second power electronic switch, a first-order voltage compensation module, a second-order voltage compensation module, and a current compensation module;

a control end of the first power electronic switch and a control end of the second power electronic switch are respectively connected with an output end of the MCU, a first end of the first power electronic switch is connected with a first end of the first-order voltage compensation module, a second end of the first power electronic switch is connected with a first end of the current compensation module, a first end of the second power electronic switch is connected with a first end of the second-order voltage compensation module, a second end of the second power electronic switch is connected with the second end of the first power electronic switch, and the first power electronic switch and the second power electronic switch are respectively configured to control a startup and a shutdown of the current compensation module and the second-order voltage compensation module according to a signal output by the MCU;

a second end of the current compensation module is connected with the BUCK-BOOST power supply chip, and is configured to compensate for the current of the BUCK-BOOST power supply chip;

a second end of the second-order voltage compensation module is connected with the BUCK-BOOST power supply chip, and is configured to compensate for the voltage of the BUCK-BOOST power supply chip;

a second end of the first-order voltage compensation module is respectively connected with a third end of the current compensation module and a third end of the second-order voltage compensation module, and a third end of the first-order voltage compensation module, a fourth end of the second-order voltage compensation module and a fourth end of the current compensation module are grounded; a fourth end of the first-order voltage compensation module is connected with a fifth end of the second-order voltage compensation module, and is configured to amplify the difference value between the sampling voltage and the standard end voltage and input the amplified difference value to the current compensation module and the second-order voltage compensation module;

the first end of the first power electronic switch, the second end of the second power electronic switch and the first end of the first-order voltage compensation module jointly serve as the first end of the phase compensation unit;

the second end of the current compensation module and the second end of the second-order voltage compensation module jointly serve as the second end of the phase compensation unit;

a first inductor is connected between the power supply chip and the phase compensation unit, and the first inductor is configured to store energy when the first power electronic switch and the second power electronic switch are turned on, and supply power when the first power electronic switch and the second power electronic switch are turned off; and a first end of the first inductor is connected with the first end of the BUCK-BOOST power supply chip and a fifth end of the current compensation module, and a second end of the first inductor is connected with the first end of the first power electronic switch, the second end of the second power electronic switch, and the first end of the first-order voltage compensation module.

3. The external loop compensation apparatus according to claim 2, wherein the current compensation module comprises a first capacitor, a second capacitor, a first resistor, a second resistor, and a first operational amplifier;

a positive power supply end of the first operational amplifier serves as the first end of the current compensation module;

an output end of the first operational amplifier serves as the second end of the current compensation module;

an in-phase input end of the first operational amplifier, a first end of the first capacitor and a first end of the second capacitor jointly serve as the third end of the current compensation module;

a negative power supply end of the first operational amplifier serves as the fourth end of the current compensation module;

a first end of the first resistor serves as the fifth end of the current compensation module, and is configured to perform sampling;
a second end of the first resistor is connected with an inverted input end of the first operational amplifier; a second end of the first capacitor is connected with the output end of the first operational amplifier; a second end of the second capacitor is connected with the output end of the first operational amplifier via the second resistor;
the first capacitor is configured to perform filtering; and the second capacitor and the second resistor form a TYPE II compensator, which is configured to perform current compensation.

4. The external loop compensation apparatus according to claim 2, wherein the first-order voltage compensation module comprises a third capacitor, a third resistor, a fourth resistor, a fifth resistor, a reference power supply, and a common operational amplifier;
a positive power supply end of the common operational amplifier and a first end of the third resistor jointly serve as the first end of the first-order voltage compensation module;
an output end of the common operational amplifier and a first end of the fifth resistor jointly serve as the second end of the first-order voltage compensation module;
an inverted input end of the common operational amplifier is connected with a first end of the reference power supply; a second end of the reference power supply and a first end of the fourth resistor jointly serve as the third end of the first-order voltage compensation module;
an in-phase input end of the common operational amplifier, a first end of the third capacitor, a second end of the third resistor and a second end of the fourth resistor jointly serve as the fourth end of the first-order voltage compensation module; and
a second end of the fifth resistor is connected with a second end of the third capacitor, and the third capacitor and the fifth resistor form an RC compensation circuit, which is configured to perform first-order voltage compensation.

5. The external loop compensation apparatus according to claim 2, wherein the second-order voltage compensation module comprises a sixth resistor, a fourth capacitor, and a second operational amplifier;
a positive power supply end of the second operational amplifier serves as the first end of the second-order voltage compensation module;
an output end of the second operational amplifier and a first end of the sixth resistor jointly serve as the second end of the second-order voltage compensation module;
an inverted input end of the second operational amplifier serves as the third end of the second-order voltage compensation module;
a negative power supply end of the second operational amplifier serves as the fourth end of the second-order voltage compensation module;
an in-phase input end of the second operational amplifier and a first end of the fourth capacitor jointly serve as the fifth end of the second-order voltage compensation module; and
a second end of the sixth resistor is connected with a second end of the fourth capacitor, and the fourth capacitor and the sixth resistor form an RC compensation circuit, which is configured to perform second-order voltage compensation on the basis of the first-order voltage compensation of the first-order voltage compensation module.

6. The external loop compensation apparatus according to claim 1, wherein the power compensation unit comprises a voltage stabilizing chip, a voltage withstanding capacitor, and a filter capacitor;
a common end of a first end of the voltage stabilizing chip, a second end of the voltage stabilizing chip, a first end of the voltage withstanding capacitor and a first end of the filter capacitor serves as the first end of the power compensation unit;
a common end of a third end of the voltage stabilizing chip, a fourth end of the voltage stabilizing chip, a second end of the voltage withstanding capacitor and a second end of the filter capacitor serves as the second end of the power compensation unit; and
the voltage withstanding capacitor is configured to perform energy storage and low-frequency filtering on the output of a rear end of the power compensation unit, and the filter capacitor is configured to perform high-frequency filtering.

7. The external loop compensation apparatus according to claim 6, wherein there are a plurality of voltage withstanding capacitors, and the plurality of voltage withstanding capacitors are connected in parallel; and there are a plurality of filter capacitors, and the plurality of filter capacitors are connected in parallel.

8. The external loop compensation apparatus according to claim 1, further comprising a Baseboard Management Controller (BMC), wherein a third end of the MCU is connected with the BMC, and is configured to report abnormal information.

9. The external loop compensation apparatus according to claim 1, the power detection unit is further configured to obtain a current value according to a sampled signal, and feeds back the sampled voltage value and the current value to the MCU via a link.

10. A loop compensation method, applied to a loop compensation apparatus comprising a power detection unit, a compensation unit and a microcontroller unit (MCU), wherein the method comprises:
acquiring a power supply parameter of a buck circuit-boost circuit (BUCK-BOOST) power supply chip via the power detection unit;
acquiring a working state of the BUCK-BOOST power supply chip according to the power supply parameter, wherein the working state of the BUCK-BOOST power supply chip comprises a boost state and a buck state;
judging whether a difference value between a sampling voltage and a standard end voltage is less than a preset value;
when the difference value is less than the preset value, determining that the compensation mode of the compensation unit is a power compensation mode, and performing power compensation on the BUCK-BOOST power supply chip; and
when the difference value is not less than the preset value, determining that the compensation mode of the compensation unit is a phase compensation mode, when the working state of the BUCK-BOOST power supply chip is the boost state, performing current compensation on the BUCK-BOOST power supply chip; and when the working state of the BUCK-BOOST power supply chip is the buck state, performing voltage compensation on the BUCK-BOOST power supply chip;

controlling the compensation unit to compensate for the BUCK-BOOST power supply chip in the compensation mode.

11. The loop compensation method according to claim 10, wherein the power supply parameter comprises a sampling voltage, a sampling current, and a first voltage ripple signal.

12. The loop compensation method according to claim 10, wherein acquiring the working state of the BUCK-BOOST power supply chip according to the power supply parameter comprises:
- when the sampling voltage is higher than the standard end voltage of the BUCK-BOOST power supply chip, determining that the working state of the BUCK-BOOST power supply chip is the boost state; and
- when the sampling voltage is lower than the standard end voltage of the BUCK-BOOST power supply chip, determining that the working state of the BUCK-BOOST power supply chip is the buck state.

13. The loop compensation method according to claim 12, wherein after compensating for the BUCK-BOOST power supply chip in the compensation mode, the method further comprises:
- acquiring a second voltage ripple signal of the BUCK-BOOST power supply chip;
- judging whether the second voltage ripple signal meets a second preset condition;
- when the second voltage ripple signal meets the second preset condition, determining that power supply compensation is completed; and
- when the second voltage ripple signal does not meet the second preset condition, determining that the power supply compensation is not completed.

14. The loop compensation method according to claim 13, wherein when the second voltage ripple signal does not meet the second preset condition, after determining that the power supply compensation is not completed, the method further comprises: reporting abnormal information.

15. A computer non-transitory readable storage medium, wherein a computer program is stored on the computer non-transitory readable storage medium, and the computer program is configured to execute, when executed by a processor, the steps of the loop compensation method as claimed in claim 10.

* * * * *